United States Patent [19]
Hatfield et al.

[11] 3,837,730
[45] Sept. 24, 1974

[54] MATRIX-ADDRESSED LIQUID CRYSTAL DISPLAY

[75] Inventors: Walter Bryan Hatfield, Fair Haven; Donald Lawrence White, Bernardsville, both of N.J.

[73] Assignee: Bell Telephone Laboratories, Incorporated, Murray Hill, Berkeley Heights, N.J.

[22] Filed: Nov. 28, 1973

[21] Appl. No.: 419,613

[52] U.S. Cl. ........ 350/160 LC, 23/230 LC, 315/169
[51] Int. Cl. .............................................. G02f 1/16
[58] Field of Search .................. 350/160 R, 160 LC; 250/331; 23/230 LC; 315/169

[56] References Cited
UNITED STATES PATENTS

| | | | |
|---|---|---|---|
| 3,440,620 | 4/1969 | French | 350/160 LC |
| 3,650,603 | 3/1972 | Heilmeier et al. | 350/160 LC |
| 3,669,525 | 6/1972 | Adams et al. | 350/160 LC |
| 3,748,753 | 7/1973 | Whitcomb | 350/160 LC |
| 3,776,615 | 12/1973 | Tsukamoto et al. | 350/160 LC |
| 3,781,088 | 12/1973 | Tsukamoto et al. | 350/160 LC |
| 3,790,251 | 2/1974 | Wysocki et al. | 350/160 LC |

OTHER PUBLICATIONS

"Cholesteric Liquid Crystals for Optical Applications", Kahn, 3-71, Applied Physics Letters, Vol. 18, No. 6, pp. 231-233.

*Primary Examiner*—James W. Lawrence
*Assistant Examiner*—B. C. Anderson
*Attorney, Agent, or Firm*—L. C. Canepa

[57] ABSTRACT

A row-by-row matrix-addressed display comprises a plurality of liquid crystal cells. Each cell includes a cholesteric-type liquid, with a pleochroic dye dissolved in the liquid crystal material. In operation, each cell has applied thereto either an energizing voltage or an above-zero holding voltage. When energized, a cell is transparent. In response to the holding voltage a cell is either transparent or colored and turbid depending, respectively, on whether or not an energizing voltage was last applied thereto. The clear state at the holding voltage is metastable and eventually decays to the colored turbid condition.

4 Claims, 2 Drawing Figures

PATENTED SEP 24 1974 3,837,730

MATRIX-ADDRESSED LIQUID CRYSTAL DISPLAY

BACKGROUND OF THE INVENTION

This invention relates to liquid crystals and, more particularly, to a multi-cell matrix-addressed display in which each cell comprises a thin film of a host material in which a pleochroic guest material is dissolved.

The discovery in recent years of a number of new electro-optic effects in liquid crystal materials has aroused considerable interest in these materials for various display applications of practical importance. Among the potentially attractive features of liquid crystal display devices are their simplicity, low cost, and low power operation. Moreover, such devices have the potential for exhibiting relatively high brightness and good contrast ratios under ambient light conditions.

For applications requiring the display of more than say four or five characters, it has been recognized that matrix addressing of a liquid crystal display is required to keep the number of individual input leads to the display at a manageable level. For example, a display composed of an array of 50 × 100 spots has 5,000 distinct addressable points. Clearly, a matrix addressing scheme (i.e., an $x$-$y$ coincidence method) in which the number of input leads would be 150 is generally preferred over an individual spot-by-spot addressing technique which would require 5,000 separate external wiring connections.

Various types of matrix-addressed liquid crystal devices are known in the display art. See, for example, J. J. Wysocki, et al, Proceedings of the Society Information Display, 13, 114 (1972) and Electronics, 45, No. 22, 53 (172). However, these and other known display devices suffer from one or more of the following disadvantages: they are relatively dim in appearance, they must be operated in a so-called projection mode, they require a relatively high voltage for operation, or they exhibit such a low storage time that the size of the matrix array and therefore its characteristic display capabilities are limited.

SUMMARY OF THE INVENTION

An object of the present invention is an improved display device.

More specifically, an object of this invention is a high-capacity matrix-addressed liquid crystal display characterized by low-voltage operation and advantageous brightness and contrast ratio properties.

Briefly, these and other objects of the present invention are realized in a specific illustrative embodiment thereof that includes a plurality of liquid crystal cells arranged in a matrix array of rows and columns. Each cell comprises a cholesteric-type liquid crystal material characterized by positive dielectric anisotropy, with a pleochroic dye dissolved in the liquid crystal material. Quiescently, in the absence of an applied voltage, the proposed cell is relatively dark. The application to the cell of an energizing voltage above a well-defined transition voltage causes the cell to become transparent. When the voltage applied to a transparent cell is reduced to a point just below the transition voltage (to a so-called holding voltage), the transparent condition of the cell persists as a metastable state for a considerable time. Eventually, the metastable state decays to the dark state.

A row-by-row matrix-addressed display composed of the proposed liquid crystal cells, each operated at either its energizing or its holding voltage, exhibits advantageous brightness and contrast-ratio characteristics and can be constructed to form relatively large arrays. Moreover, the transition voltage of each cell can be established at a value that is compatible with complementary MOS integrated circuits. A display system including such circuits requires only microwatts of power.

BRIEF DESCRIPTION OF THE DRAWING

A complete understanding of the present invention and of the above and other objects and advantages thereof may be gained from a consideration of the following detailed description presented hereinbelow in connection with the accompanying drawing in which.

DETAILED DESCRIPTION

Figure 1:
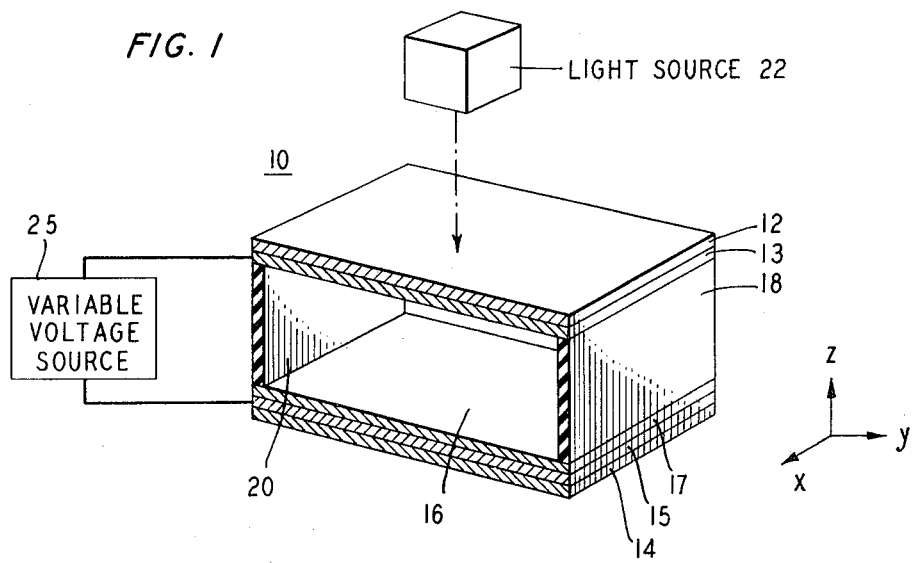
FIG. 1 is a diagrammatic side view in cross-section of an individual liquid crystal cell that embodies the principles of the present invention.

Illustratively, the liquid crystal cell arrangement shown in FIG. 1 is, except for the nature of variable voltage source 25, identical to the cell disclosed in G. N. Taylor-D. L. White application Ser. No. 339,368, filed Mar. 8, 1973.

The liquid crystal material included in the cell of the Taylor-White application is characterized by a so-called transition field. Operation of the Taylor-White cell is carried out by applying thereto a voltage sufficient to cause the field in the material to reach or exceed the transition value. When that occurs, the Taylor-White cell appears transparent to incident light, thereby producing a relatively bright display. In the only other operating mode disclosed by the Taylor-White disclosure, the voltage applied to the liquid crystal material is reduced to zero. In that case, the cell absorbs most of the incident light, thereby to provide a relatively dark display.

There is no discussion in the Taylor-White application of operating the liquid crystal cell disclosed therein between an energizing voltage and an intermediate above-zero holding voltage to achieve a so-called metastable state. As described hereinbelow, our discovery of the existence of a metastable state in such a cell forms the basis for an improved type of matrix-addressed liquid crystal display.

The specific illustrative liquid crystal cell or device shown in FIG. 1 includes two parallel glass plates 12 and 14 having a thin dye-liquid crystal film 16 sandwiched between them. Thin conductive coatings 13 and 15 of, for example, $In_2O_3$ - $SnO_2$ on the respective facing surfaces of the plates 12 and 14 provide transparent electrodes by means of which a uniform electric field can be established through the depicted film 16. Spacers 18 and 20 made, for example, of a glass frit or a polymer such as Mylar or Teflon maintain the thickness of the film at any desired value in the range of approximately 5 to 30 microns measured in the $z$ direction.

Light source 22 shown in FIG. 1 comprises, for example, a conventional light bulb that provides ambient illumination for the device 10. (The source 22 is merely representative of whatever illuminating means exists in the vicinity of the device 10 and is not a component part thereof.)

The source 25 of FIG. 1 is connected to apply a variable voltage between the coatings 13 and 15 of the cell 10. This voltage may be either d.c. or a.c. in nature. For a.c. operation, frequencies up to about 20 kHz may be used, with frequencies of 50 to 1,000 Hz being preferred. Typical magnitudes for the voltage applied by the source 25 to the coatings 13 and 15 will be specified later below.

The device 10 shown in FIG. 1 may be operated in the so-called transmission mode (in which case element 17 of FIG. 1 is omitted). In that operating mode the light source 22 is disposed on one side of the device and an observer, i.e., a human being, would position himself on the other side of the device to view light transmitted through the transparent plate 14. Alternatively, the top surface of the layer 15 may be coated with a highly reflecting material 17, which is, for example, silver. Or a diffuse or specular reflecting mirror coating (not shown) may be placed on or spaced apart from the bottom surface of the plate 14. In any of these last-mentioned cases the observer would position himself to view light that is reflected from such a coating and then transmitted back through the upper plate 12 of FIG. 1. In other words in that operating mode, the reflection mode, both the source 22 and the observer are located on the same side of the device 10.

The film 16 included in the device 10 of FIG. 1 includes as one main component thereof a liquid crystal material that exhibits helical molecular ordering. This component may comprise, for example, a cholesteric liquid crystal material of the type described by F. J. Kahn in "Cholesteric Liquid Crystals for Optical Applications," Applied Physics Letters, March 1971, pp. 231–233.

However, for reasons set forth below, it is generally advantageous to constitute the liquid crystal material in the film 16 as a mixture of a nematic liquid crystal and an optically active material such as, for example, a cholesteric material of the type described in the aforementioned Kahn article. (The term "optically active" is employed herein to characterize a material in which the plane of polarization of linearly polarized light is rotated as the light passes through the material.) Other examples of optically acitve materials suitable for inclusion in the mixture are the active amyl ester of N-(p-cyanobenzylidene-p-aminocinnamic acid), hereinafter designated CBACAA, the active amyl ester of N-(p-carboxybenzy-lidene)-P-aminobenzonitrile and l-menthol. Advantageously, the molecules of the optically active material should be similar to the host liquid crystal (i.e., long and rod-like), as is the case with CBACAA.

Such a mixture exhibits a helical molecular structure whose pitch is a function of the relative concentrations of the nematic liquid crystal material and the optically active material. More specifically, if the densities of the mixed substances differ only slightly, the ratio of the pitch of the pure optically active material to that of the mixture will be equal to the concentration of the optically active component of the liquid crystal mixture.

Accordingly, by employing such a mixture, it is possible in effect to formulate a substance whose helical pitch assumes any desired value. This provides an important design flexibility that makes it possible to tailor the switching voltage and contrast ration properties of the device 10 to meet the requirement of various specific applications.

It is characteristic of such a mixture that it exhibits a different structural order property than do cholesterics or mixtures of cholesterics alone. In turn, this property is the basis for maximizing the anisotropy and absorption characteristics of the thin film 16.

One advantageous liquid crystal mixture adapted to be included in the device 10 of FIG. 1 comprises a nematic liquid crystal mixture having positive dielectric anisotropy mixed with an optically active material such as the aforementioned CBACAA. The nematic liquid crystal mixture comprises, for example, equal parts by weight of the N-(p-butoxy), N-(p-hexyloxy), and N-(p-octanoyloxy)-benzylidene-p-aminobenzonitriles, or mixtures of 4-N-(4'-n-hexylbenzylidene)-aminobenzonitrile and 4-N-(4'-n-propyl-benzylidene)-aminobenzonitrile, or mixtures of 4'-cyanophenyl-4-n-butylbenzoate and 4'-cyanophenyl-4-n-heptylbenzoate, as reported by A. Boller, H. Scherrer, M. Schodt and P. Wild, Proceedings of the I.E.E.E., 60, 1002 (1972). Mixtures of the nematic liquid crystal and the optically active material in the range of about 5 to 15 percent by weight of the optically active material impart to the mixture a helical molecular ordering with a pitch value of about 1.0 to 3 microns.

Both of the aforementioned materials included in the liquid crystal mixture include rod-like molecules and exhibit a positive dielectric anisotropy. In such a material the electric susceptibility parallel to the longitudinal axis of a molecule thereof is greater than the electric susceptibility perpendicular to the longitudinal molecular axis.

When the helical pitch of the mixture approximates the wavelength of visible light directed at the thin film 16, the light propagates through the film in right- and left-handed elliptically polarized modes. When the pitch exceeds about 10 wavelengths, the mixture appears to the incident light very much like a nonhelical nematic-type structure which propagates linearly polarized modes. In accordance with the principles of the present invention, this second mentioned propagation mode is to be avoided on a steady-state basis in the absence of an above-transition-value electric field in the film 16. Hence, as a practical matter, the pitch of the mixture is usually designed to be less than about ten wavelengths of the incident visible light.

The pitch of the helical configuration of the aforedescribed mixture should not be made much less than a wavelength of the incident visible light. If it is made much less, the voltage required across the film 16 to establish an electric field therein sufficient to unwind the helix may be too large for some applications of practical importance. Accordingly, the pitch is usually designed not to be less than about one wavelength.

As disclosed in the Taylor-White application, the second main component included in the thin film 16 is a pleochroic material such as, for example, a soluble nonionic dye. One such suitable dye is 2-(4-N,N-diethylaminoazophenyl)-5-nitrothiazole mixed in the liquid crystal mixture in a concentration of about ¼ to 1 percent by weight of the dye.

It is characteristic of such a dye that it absorbs light preferentially: its optical absorption spectrum is a strong function of the polarization of the incident light with respect to the orientation of the dye molecules. Specifically, when the electric vector representative of light polarization is parallel to the longitudinal axis of such a dye molecule, the molecule is relatively absorptive of that portion of the incident light whose wavelengths fall within a prescribed range. As a result of this absorption, the dye molecules dispersed in the film 16 exhibit a characteristic color. The device is then said to be in its dark state. On the other hand, when the electric vector of the incident light is perpendicular to the longitudinal axis of such a dye molecule, the molecule appears relatively transparent. Accordingly, under that set of circumstances, the film 16 or some preselected localized portion thereof assumes a relatively clear or bright state.

An important factor for achieving high contrast ratio and brightness in a device of the type described herein is that the transition moment vector of the pleochroic guest have an orientation with respect to the crystallographic axis of the liquid crystalline host that is most nearly parallel thereto. Ideally the transition moment axis of the dye molecule should be most nearly parallel to its long molecular axis. The order of the dye relative to that of the liquid crystal optic axis depends on the order of the liquid crystal host molecules and the nature of the dye molecules. By selection of appropriate dye molecules, the ordering of the dye molecules may be greater than that of the host molecules. Dyes which exemplify this characteristic are the aforementioned 2-(4-N,N-diethylaminoazophenyl)-5-nitrothiazole and, in addition, the nematic liquid crystalline dye N-(p-methoxybenzylidene)-1-amino-4-(4'-cyanophenylazo) napthalene. Classes of elongated dyes which also meet this requirement are azoic dyes, azo dyes, quinone dyes, merocyanine dyes, disperse dyes and liquid crystalline dyes.

When an electric field is applied to a cholesteric liquid crystal material that is characterized by positive dielectric anisotropy, the pitch of the material increases and eventually, when the electric field reaches a certain critical or transition field, $E_c$, the pitch becomes essentially infinite; i.e., the material appears to be nematic. The critical field for such a material is defined by $$E_c = 1/q \ \sqrt{K/\Delta\epsilon},$$

where $q =$ pitch in cm, $K =$ elastic constant, and $\Delta\epsilon =$ dielectric anisotropy.

If the pitch is made relatively long, say only several pitches equal the thickness of the cell, and the dielectric anisotropy is large, as it is in the liquid crystal materials specified herein, the corresponding critical voltage can be controlled to be quite small.

When the voltage applied by the source 25 of FIG. 1 to the coatings 13 and 15 reaches a point at which the corresponding field in the film 16 reaches the so-called critical or transition value, the aforementioned helical molecular ordering is in effect unwound to establish a homeotropic molecular ordering. For film thicknesses and helical pitches having values in the ranges discussed above, a.c. voltages less than 10 to about 30 volts rms are effective to accomplish such molecular reordering.

It is advantageous to establish initially in the film 16 of FIG. 1 a helical ordering in which the helical axes in the immediate vicinity of the electrodes 13 and 15 lie in a plane parallel to the x-y plane. This arrangement is achieved by applying to the coatings 13 and 15 a surfactant, for examply N,N-dimethyl-N-octadecyl-3-aminopropyltrimethoxysilyl chloride, which causes the surface molecules of the film 16 to align with their longitudinal axes perpendicular to the coatings. Even with such an imposed surface alignment, however, major bulk portions of the film 16 are characterized by a helical ordering whose axes are on the average at an angle to the coatings. Hence, the aforedescribed absorption phenomenon will still occur in the film to a considerable extent in the absence of an applied electric field. When an electric field exceeding the transition value is applied to such a device, the bulk helical ordering is unwound and as a result the film 16 is relatively transmissive. When the applied field is entirely removed from such an arrangement (or at least reduced below the transition value to or below a relatively low value of field designated the spontaneous value), the film 16 almost immediately exhibits both absorption and scattering of incident light. This is a stable no-field (or low-field) effect which causes the film to present a milky or cloudy appearance. Switching of the device between these clear and cloudy states may be done in a relatively high speed manner. As indicated, these states correspond with the establishment in the film 16 of above-transition and zero (or low) fields, respectively.

The present invention is based on the discovery that when the voltage applied across the film 16 of FIG. 1 is first lowered below the critical or transition voltage $V_c$ to a value above the spontaneous voltage $V_s$, the visible state of the cell 10 remains substantially unchanged. In time cholesteric domains generated by line dislocations are observed growing from some nucleation sites in the liquid crystal mixture. If the applied voltage is reduced to a point just under the critical voltage (say to a value about 95 percent of the critical voltage), the number of such domains is relatively small and their rate of growth is relatively slow. In that case the liquid crystal mixture remains in its clear metastable state for a considerable length of time, for example minutes. If the applied voltage is reduced to a point considerably less than the critical voltage (say to a value about 50 percent of the critical voltage but still above the spontaneous voltage), the number and rate of growth of such domains is increased. In this latter case the mixture remains in the metastable clear state for a shorter interval, for example seconds or fractions of a second.

Thus, in accordance with applicant's discovery, a cell of the type depicted in FIG. 1 can be controlled to exhibit plural distinct states. Above $V_c$ there is only one state, namely the clear nematic state. Below $V_s$ there is only one state, namely the turbid cholesteric condition. Between $V_c$ and $V_s$ there are two states, the stable colored state and the metastable clear state which in time switches to the colored or turbid condition as a result of the aforementioned domain-growth phenomenon. Accordingly, by applying to the cell a so-called holding voltage having a value between $V_c$ and $V_s$, the liquid crystal mixture is either maintained in its colored-turbid state (if the previously applied voltage was below $V_c$) or maintained temporarily in its clear state (if the previously applied voltage was above $V_c$). Switching from the colored state to the clear state is achieved by temporarily raising the applied voltage above $V_c$. To go almost immediately from the clear to the colored state is accomplished by lowering the applied voltage below $V_s$.

Significantly, the aforementioned phenomena are polarity independent. Hence, either a positive or a negative voltage having a value intermediate $V_c$ and $V_s$ is effective to maintain a previously energized or clear cell in its metastable clear state. Similarly, either a positive or a negative holding voltage is effective to maintain a previously colored state in its turbid condition.

In accordance with one aspect of the principles of the present invention, plural cells each of the type shown in FIG. 1 and described above are combined to form a matrix-addressed liquid crystal display. An illustrative such display is depicted in FIG. 2.

Figure 2:
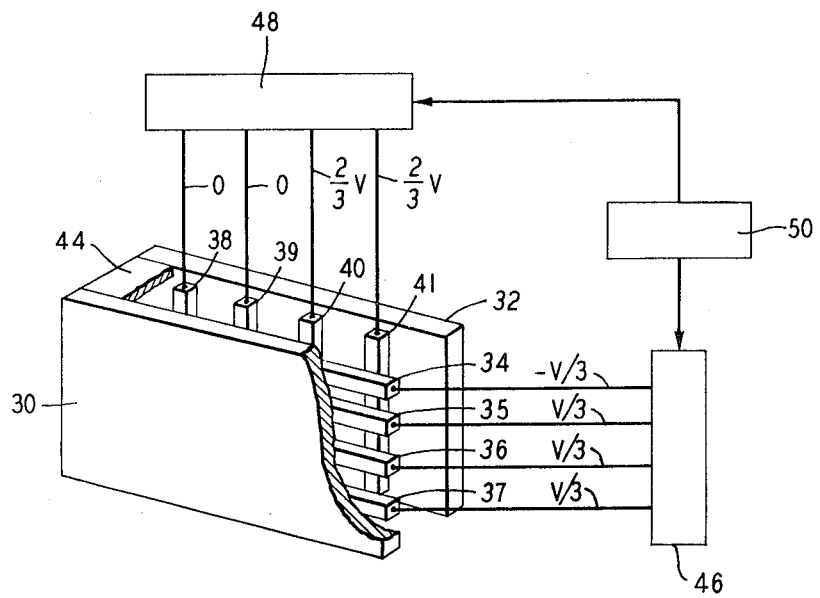
FIG. 2 is a schematic depiction of a specific illustrative multi-cell matrix display array made in accordance with this invention.

The display portion of the arrangement shown in FIG. 2 includes two transparent spaced-apart plates 30 and 32. Orthogonally disposed sets of strip electrodes are deposited in any conventional way on the inner facing surfaces of the plates 30 and 32. For illustrative purposes, one electrode set is shown as comprising four horizontal or $x$ direction elements 34 through 37 whereas the other set is depicted as comprising four vertical or $y$ direction elements 38 through 41.

The two sets of $x$-$y$ electrodes shown in FIG. 2 define therebetween 16 regions at the respective overlaps of the electrodes. For example, one such region is bounded by directly opposed facing portions of the electrodes 34 and 41. In one specific illustrative embodiment the cross-sectional area of such a region is about 0.75 mm by 0.75 mm.

The plates 30 and 32 of FIG. 2 are maintained apart a prescribed distance by an insulating rectangular framework 44. This distance is selected to insure that the thickness of the aforementioned 16 regions, i.e., the distance apart of the two sets of facing electrodes, falls within the range specified above for the thickness of the liquid crystal mixture 16 represented in FIG. 1.

The display structure shown in FIG. 2 includes a liquid crystal mixture of the type specified above in connection with the description of FIG. 1. This mixture is added between the facing surfaces of the plates 30 and 32 and is retained therein by the framework 44. As a result, the entire space between the plates is filled with the liquid crystal mixture. Accordingly, the aforementioned 16 regions defined by the two sets of orthogonally positioned electrodes are also filled with the liquid crystal mixture. The resulting structure comprises in effect 16 individual liquid crystal cells, each of the general type shown in FIG. 1. As indicated in FIG. 2, each of the cells has electrodes in common with plural other cells.

Electrical control of the respective states of the liquid crystal cells depicted in FIG. 2 is carried out by selective energization of the $x$-$y$ electrodes. Conventional $x$ and $y$ selection circuits 46 and 48, respectively, and a standard master control circuit 50 are included in the FIG. 2 arrangement for that purpose. By means of these circuits the individual liquid crystal cells of the depicted display unit may be addressed to activate (render transparent) particular ones of the individual cells. In that way a character composed of individual activated cells may be selected for display. As in the case of the single cell of FIG. 1, the FIG. 2 unit may be operated in either a transmission or a reflection mode. For operation in the latter mode, a suitable reflector (not shown in FIG. 2) is added to the unit in a straightforward manner.

In accordance with the principles of the present invention, each illustrative liquid crystal cell of the FIG. 2 array has applied thereto an a.c. voltage that is either above $V_c$ or intermediate $V_c$ and $V_s$. As indicated above, the first-mentioned voltage constitutes an energizing voltage and the second-mentioned voltage is the so-called holding voltage. If a cell is periodically addressed with an above–$V_c$ voltage, that cell can as a practical matter be maintained in its clear or transparent state. Any domain growth that starts during the application to the cell of the holding voltage is destroyed by the subsequent application thereto of the energizing voltage. Consequently, domain growth is not cumulative. It has to start all over again each time the applied voltage is temporarily reduced to the holding value. By such periodic re-energization, one or more of the cells in the display unit are made to appear to remain in their relatively transparent states. The number of cells exhibiting such a storage phenomenon that can be matrix addressed is dependent on the ratio of the length of time the clear state of a cell remains substantially clear at the holding voltage to the time required to switch a cell from the turbid condition to its clear state. As indicated earlier above, it has been found that if the holding voltage is established just slightly below $V_c$, the metastable clear state persists for a relatively long time and accordingly this ratio can be hundreds or even thousands.

A specific illustrative format for addressing the multicell liquid crystal display unit of FIG. 2 in a row-by-row fashion will now be described. Assume that each cell of the unit has applied thereto a voltage whose value is either $V$ or $V/3$, where $V_c$ is between $V/3$ and $V$, and $V/3$ is between $V_c$ and $V_s$. $V$ is the energizing voltage and $V/3$ is the holding voltage.

Assume, for example, that it is desired to activate only a selected two of the 16 cells shown in FIG. 2. In particular, the two cells to be activated will be assumed to be those respectively defined by the overlap of electrodes 34 and 40 and the overlap of electrodes 34 and 41. The activation of these two cells is accomplished by applying control voltages to the eight $x$-$y$ leads that extend between the selection circuits 46 and 48 and the electrodes 34 through 41. The respective voltages applied to those eight leads are indicated in FIG. 2. The left-hand two of the vertically extending or $y$ leads have 0 volts applied thereto, whereas the right-hand two $y$ leads each have $2V/3$ volts applied thereto. The upper one of the horizontally extending or $x$ leads has $-V/3$ volts applied thereto, whereas the remaining $x$ leads each have $V/3$ volts applied thereto. It is apparent that the voltage difference applied across each of the two selected cells is $V$. Hence, these cells are switched to their clear states. But either $+V/3$ or $-V/3$ volts are applied to every other one of the cells. Since, as mentioned earlier above, the herein-considered physical phenomena exhibited by the cells are polarity independent, all of these other cells have a below–$V_c$ value of holding voltage applied thereto. Hence, these other cells remain in their colored states (assuming no previous activation of any of the cells of the depicted array).

Next, the second row of the FIG. 2 display is addressed by applying $-V/3$ to the electrode 35 and $+V/3$ to each of the other $x$ electrodes. And assuming that none of the cells in the second row is to be activated, 0 volts would be applied to each of the $y$ electrodes 38 through 41. In that case every one of the 16 cells would have a holding voltage applied thereto. Accordingly, the previously unactivated 14 cells would remain colored, whereas the two previously activated cells would be switched to their metastable clear states.

In a similar manner, subsequent addressing of the third and fourth rows of cells shown in FIG. 2 takes place in response to control signals provided by the circuit 50. During such addressing, the respective conditions of the two initially activated cells are decaying from their fully clear states. But this decay can be controlled to be sufficiently small that to an observer these cells appear to remain in their relatively clear conditions. Moreover, for illustrative purposes it is assumed that no additional cells are rendered clear. This occurs if the particular illustrative voltage conditions specified for the second row are simply repeated in sequence for the third and fourth rows.

Finally, the aforedescribed addressing cycle is repeated by again addressing the first row of cells shown in FIG. 2. Establishment of the voltage conditions listed in FIG. 2 causes the two originally activated cells in the first row to be reactivated or refreshed. In response thereto, the decay of those two cells from their fully clear state is terminated and the cells are again switched to their fully transparent conditions. In this way periodic row-by-row addressing of the depicted matrix is effective to maintain specified ones of the liquid crystal cells in their relatively clear conditions.

To change the information displayed by the illustrative unit, rapid extinction of activated cells may be carried out. This is accomplished by abruptly reducing the voltage applied to previously activated cells. By reducing the applied voltage to 0 or at least to below $V_s$, clear cells are rapidly switched to their colored states.

The liquid crystal cells described herein are characterized by a high degree of dielectric anisotropy. For example, the dielectric constant of such a cell may be about 20 in its clear state and about 10–15 in its colored condition. Thus, the capacitance of a typical 10 $\mu$m thick cell is about 200 pf/cm$^2$. At an operating frequency of 50 Hz and a holding voltage of about 6–7 volts, the power consumption of such cells approximates $5 \times 10^{-7}$ watts/cm$^2$.

Holding voltages ($V/3$) in the range of 6–7 volts and activating voltages ($V$) in the range of 18–20 volts are compatible with complementary MOS integrated circuits. Accordingly, the associated circuits needed to control and drive the liquid crystal cells shown in FIG. 2 may advantageously be of that type. Moreover, because of the low power consumption of the liquid crystal cells, the power requirements imposed on the associated circuits are also relatively low.

In practice it has been found that this power consumption is so low that an overall display arrangement of the type shown in FIG. 2 may, for example, be operated directly from conventional telephone lines that are connected to station apparatus at a customer's premises. Accordingly, the FIG. 2 arrangement is well suited for constructing a display panel to be associated with such apparatus.

It is to be understood that the above-described arrangements are only illustrative of the application of the principles of the present invention. In accordance with those principles, numerous other alternative arrangements may be devised by those skilled in the art without departing from the spirit and scope of the invention.

What is claimed is:

1. A display cell comprising:
   a liquid crystal host material characterized by a helical molecular ordering in the absence of an electric field or in the presence of a steady-state electric field whose value is less than the transition value for said material and characterized by a homeotropic molecular ordering in the presence of an electric field whose value exceeds said transition value,
   a pleochroic guest material in said host material to form a mixture in which said host and guest materials assume corresponding molecular orderings, said guest material being absorptive of light when helically ordered and nonabsorptive of light when homeotropically ordered,
   and means for applying through said guest-host material an electric field whose value is either (1) above the characteristic spontaneous value for said material but below said transition value, or (2) above said transition value.

2. A liquid crystal display device adapted to be included in a matrix-addressed array, said device comprising a cholesteric-type liquid crystal material having positive dielectric anisotropy, a pleochroic dye dissolved in said material, said material being responsive to an applied energizing voltage above a threshold value for transmitting ambient illumination and responsive to an applied holding voltage having a value slightly below said threshold value for absorbing ambient illumination, except that when said applied voltage is first reduced from said energizing value to said holding value said material switches to a metastable state in which the material continues to transmit ambient illumination for a predetermined period of time, and means for applying to said material either said energizing voltage or said holding voltage.

3. A matrix-addressed display comprising a plurality of liquid crystal devices arranged in an array of rows and columns, each of said devices comprising a cholesteric-type liquid crystal material having positive dielectric anisotropy, a pleochroic dye dissolved in said material, said material being responsive to an applied energizing voltage above a threshold value for transmitting ambient illumination and responsive to an applied holding voltage having a value slightly below said threshold value for absorbing ambient illumination, except that when said applied voltage is first reduced from said energizing value to said holding value said material switches to a metastable state in which the material continues to transmit ambient illumination for a predetermined period of time, and a plurality of overlapping row and column electrodes, said devices being respectively disposed between the overlaps of said electrodes.

4. A display as in claim 3 further comprising means connected to said electrodes for addressing said devices in a row-by-row fashion, said means being adapted to apply said energizing voltage across each of those devices in a row that is to be rendered transparent and to apply said holding voltage to all other devices in said array, said energizing voltage being greater than the transition voltage of said devices and said holding voltage being less than said transition voltage but greater than the spontaneous voltage of each device.

* * * * *